US010037013B2

(12) United States Patent
Song et al.

(10) Patent No.: US 10,037,013 B2
(45) Date of Patent: Jul. 31, 2018

(54) METHOD AND APPARATUS FOR MANAGING ENERGY BY ANALYZING ENERGY USAGE PATTERN OF ELECTRIC DEVICE

(75) Inventors: Kwan-woo Song, Yongin-si (KR); Ii-kang Na, Seoul (KR); Jong-hyun Shin, Suwon-si (KR); Dong-yun Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 879 days.

(21) Appl. No.: 13/616,840

(22) Filed: Sep. 14, 2012

(65) Prior Publication Data
US 2013/0197708 A1 Aug. 1, 2013

(30) Foreign Application Priority Data
Jan. 31, 2012 (KR) .................. 10-2012-0009747

(51) Int. Cl.
G06F 1/32 (2006.01)
G05B 15/02 (2006.01)
H04L 12/28 (2006.01)
H04Q 9/00 (2006.01)
H02J 3/00 (2006.01)
H02J 3/14 (2006.01)
H02J 13/00 (2006.01)

(52) U.S. Cl.
CPC ............ *G05B 15/02* (2013.01); *H04L 12/282* (2013.01); *H04L 12/2829* (2013.01); *H04Q 9/00* (2013.01); *H02J 3/14* (2013.01); *H02J 13/0006* (2013.01); *H02J 2003/003* (2013.01); *H02J 2003/143* (2013.01); *H02J 2003/146* (2013.01); *H04Q 2209/10* (2013.01); *Y10T 307/766* (2015.04)

(58) Field of Classification Search
None
See application file for complete search history.

(56) References Cited

U.S. PATENT DOCUMENTS 5,274,571 A * 12/1993 Hesse et al. .................. 700/291
8,761,951 B2 * 6/2014 Jerome ......................... 700/295
8,989,910 B1 * 3/2015 Klots ..................... G06Q 50/06
700/291

(Continued)

FOREIGN PATENT DOCUMENTS

JP 2011-150650 8/2011
KR 10-2011-0022514 3/2011

OTHER PUBLICATIONS

Korean Office Action dated Apr. 25, 2018 in Korean Patent Application No. 10-2012-0009747.

*Primary Examiner* — Sean Shechtman
(74) *Attorney, Agent, or Firm* — Staas & Halsey LLP

(57) ABSTRACT

An energy management device which manages energy usage of at least one electric device, the energy management device including a sensor unit for detecting environment conditions including at least one of temperature, humidity, and luminance of an environment where the electric device is used; a pattern analyzing unit for analyzing an energy usage pattern of a user for using the electric device; and an energy management unit for generating energy management information for managing energy usage of the electric device based on the detected environment conditions and the analyzed energy usage pattern.

15 Claims, 6 Drawing Sheets

| ELECTRIC DEVICES | EXCESSIVE USAGE REFERENCE PATTERNS | |
|---|---|---|
| AIR CONDITIONER | OPERATION MODE IS COOLING MODE AND SET TEMPERATURE IS 18 DEGREES CELSIUS OR LOWER | CONTINUOUS OPERATION FOR 30 MINUTES OR LONGER |
| | OPERATION MODE IS COOLING MODE AND SET TEMPERATURE IS 5 DEGREES OR MORE LOWER THAN OUTSIDE TEMPERATURE | CONTINUOUS OPERATION FOR 30 MINUTES OR LONGER |
| | OPERATION IN TURBO MODE | CONTINUOUS OPERATION FOR 30 MINUTES OR LONGER |
| | OPERATION TIME IS 6 HOURS OR LONGER | OPERATION FOR 6 HOURS OR LONGER |
| TV | NO USER MOVEMENT AND OPERATION TIME IS 4 HOURS OR LONGER | OPERATION FOR 4 HOURS OR LONGER |
| | NO USER MOVEMENT AND OPERATION TIME IS 1 HOUR OR LONGER IN TIME SLOT TO WHICH EXPENSIVE ELECTRICITY PRICE RATE IS APPLIED | OPERATION FOR 1 HOUR OR LONGER |
| REFRIGERATOR | NUMBER OF TIMES OF OPENING DOOR PER DAY | 20% OR HIGHER WITH RESPECT TO CUMULATIVE AVERAGE |
| | DOOR OPEN DURATION IS EQUAL TO OR EXCEEDS PREDETERMINED DURATION | 1 MINUTE OR LONGER |
| | SET TEMPERATURE IS NOT SUITABLE TEMPERATURE | 1 MINUTE OR LONGER 15 DEGREES IN FREEZER |
| | OPERATION IN TURBO MODE | MAINTAIN FOR 30 MINUTES OR LONGER |
| LAUNDRY MACHINE | WASHING FREQUENCY PER MONTH | 20% OR HIGHER WITH RESPECT TO CUMULATIVE AVERAGE |
| | OPERATION IN TURBO MODE | 20% OR HIGHER WITH RESPECT TO CUMULATIVE AVERAGE |
| | WASHING IN TIME SLOT TO WHICH EXPENSIVE ELECTRICITY PRICE RATE IS APPLIED | |
| LED LIGHTING DEVICE | TOTAL DURATION OF USAGE PER DAY | 20% OR HIGHER WITH RESPECT TO AVERAGE DURATION OF USAGE PER DAY |
| | LUMINANCE IS EQUAL TO OR ABOVE A PREDETERMINED VALUE AND IN DAYTIME | OPERATION FOR 30 MINUTES OR LONGER |

(56) References Cited

U.S. PATENT DOCUMENTS

| | | | |
|---|---|---|---|
| 2010/0289643 A1* | 11/2010 | Trundle et al. | 340/545.1 |
| 2010/0292961 A1* | 11/2010 | Moss | 702/188 |
| 2011/0049984 A1 | 3/2011 | Son | |
| 2011/0166913 A1* | 7/2011 | Buchanan | 705/7.39 |

* cited by examiner

FIG. 2

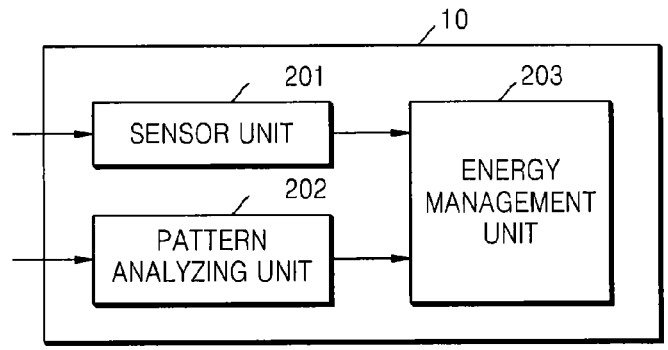

FIG. 3

| ELECTRIC DEVICES | USAGE PATTERNS | EXAMPES |
|---|---|---|
| AIR CONDITIONER | OPERATION MODE | 1. COOLING<br>2. TURBO<br>3. ENERGY-SAVING<br>4. FAN |
| | SET TEMPERATURE | |
| | DURATION OF USAGE | |
| REFRIGERATOR | OPERATION MODE | 1. NORMAL<br>2. TURBO<br>3. ENERGY-SAVING |
| | SET TEMPERATURE | |
| | DOOR OPEN DURATION | 20 SECONDS<br>PER OPENING |
| | DOOR OPEN FREQUENCY | |
| TV | DURATION OF USAGE | |
| LAUNDRY MACHINE | USE FREQUENCY | |
| | OPERATION MODE | 1. WASHING<br>2. DRYING<br>3. BUBBLE |
| | DURATION OF USAGE | |
| LED LIGHTING DEVICE | DURATION OF USAGE | |

FIG. 5

| ELECTRIC DEVICES | | EXCESSIVE USAGE REFERENCE PATTERNS | |
|---|---|---|---|
| AIR CONDITIONER | | OPERATION MODE IS COOLING MODE AND SET TEMPERATURE IS 18 DEGREES CELSIUS OR LOWER | CONTINUOUS OPERATION FOR 30 MINUTES OR LONGER |
| | | OPERATION MODE IS COOLING MODE AND SET TEMPERATURE IS 5 DEGREES OR MORE LOWER THAN OUTSIDE TEMPERATURE | CONTINUOUS OPERATION FOR 30 MINUTES OR LONGER |
| | | OPERATION IN TURBO MODE | CONTINUOUS OPERATION FOR 30 MINUTES OR LONGER |
| | | OPERATION TIME IS 6 HOURS OR LONGER | OPERATION FOR 6 HOURS OR LONGER |
| TV | | NO USER MOVEMENT AND OPERATION TIME IS 4 HOURS OR LONGER | OPERATION FOR 4 HOURS OR LONGER |
| | | NO USER MOVEMENT AND OPERATION TIME IS 1 HOUR OR LONGER IN TIME SLOT TO WHICH EXPENSIVE ELECTRICITY PRICE RATE IS APPLIED | OPERATION FOR 1 HOUR OR LONGER |
| REFRIGERATOR | | NUMBER OF TIMES OF OPENING DOOR PER DAY | 20% OR HIGHER WITH RESPECT TO CUMULATIVE AVERAGE |
| | | DOOR OPEN DURATION IS EQUAL TO OR EXCEEDS PREDETERMINED DURATION | 1 MINUTE OR LONGER |
| | | SET TEMPERATURE IS NOT SUITABLE TEMPERATURE | 1 MINUTE OR LONGER 15 DEGREES IN FREEZER |
| | | OPERATION IN TURBO MODE | MAINTAIN FOR 30 MINUTES OR LONGER |
| LAUNDRY MACHINE | | WASHING FREQUENCY PER MONTH | 20% OR HIGHER WITH RESPECT TO CUMULATIVE AVERAGE |
| | | OPERATION IN TURBO MODE | 20% OR HIGHER WITH RESPECT TO CUMULATIVE AVERAGE |
| | | WASHING IN TIME SLOT TO WHICH EXPENSIVE ELECTRICITY PRICE RATE IS APPLIED | |
| LED LIGHTING DEVICE | | TOTAL DURATION OF USAGE PER DAY | 20% OR HIGHER WITH RESPECT TO AVERAGE DURATION OF USAGE PER DAY |
| | | LUMINANCE IS EQUAL TO OR ABOVE A PREDETERMINED VALUE AND IN DAYTIME | OPERATION FOR 30 MINUTES OR LONGER |

FIG. 6

| ELECTRIC DEVICE | DATES | USAGE PATTERNS | ENVIRONMENT CONDITIONS | ENERGY MANAGEMENT INFORMATION |
|---|---|---|---|---|
| AIR CONDITIONER | 2010-7-1 | OPERATION MODE: COOLING SET TEMPERATURE: 10 DEGREES | OUTSIDE TEMPERATURES: 18 DEGREES | CHANGE SET TEMPERATURE OF AIR CONDITIONER TO BE 5 DEGREES LOWER THAN OUTSIDE TEMPERATURE (13 DEGREES) |
| | 2010-7-30 | OPERATION MODE: COOLING SET TEMPERATURE: 10 DEGREES | OUTSIDE TEMPERATURES: 16 DEGREES | CHANGE SET TEMPERATURE OF AIR CONDITIONER TO BE 5 DEGREES LOWER THAN OUTSIDE TEMPERATURE (11 DEGREES) |
| | 2010-8-2 | OPERATION MODE: COOLING SET TEMPERATURE: 10 DEGREES | OUTSIDE TEMPERATURES: 19 DEGREES | CHANGE SET TEMPERATURE OF AIR CONDITIONER TO BE 5 DEGREES LOWER THAN OUTSIDE TEMPERATURE (14 DEGREES) |
| | 2010-8-20 | OPERATION MODE: COOLING SET TEMPERATURE: 10 DEGREES | OUTSIDE TEMPERATURES: 18 DEGREES | CHANGE SET TEMPERATURE OF AIR CONDITIONER TO BE 5 DEGREES LOWER THAN OUTSIDE TEMPERATURE (13 DEGREES) |
| | 2010-8-30 | OPERATION MODE: COOLING SET TEMPERATURE: 10 DEGREES | OUTSIDE TEMPERATURES: 17 DEGREES | CHANGE SET TEMPERATURE OF AIR CONDITIONER TO BE 5 DEGREES LOWER THAN OUTSIDE TEMPERATURE (12 DEGREES) |

METHOD AND APPARATUS FOR MANAGING ENERGY BY ANALYZING ENERGY USAGE PATTERN OF ELECTRIC DEVICE

CROSS-REFERENCE TO RELATED APPLICATIONS

This application claims the priority benefit of Korean Patent Application No. 10-2012-0009747, filed on Jan. 31, 2012, in the Korean Intellectual Property Office, the disclosure of which is incorporated herein in its entirety by reference.

BACKGROUND

1. Field

The present inventive concept relates to a method and an apparatus for managing energy by analyzing an energy usage pattern of an electric device.

2. Description of the Related Art

Recently, as oil prices keep rising and energy is becoming a scarce resource, methods of efficiently utilizing energy have been intensively studied. As a method of efficiently using energy, a household energy management system (EMS) has become popular. An EMS is a device to systematically improve energy efficiency by reducing unnecessary energy consumption.

In general, power is supplied to a household by a central power system, not a distributed power system. The central power system is a vertical and centralized network controlled by an energy producer and employs a one-way communication system for data transmission.

On the contrary, the EMS employs a two-way communication system as a default system, and thus, the EMS may monitor the amount of power consumed by consumer electronics and operational information in real time. Furthermore, the EMS may include functions to control consumer electronics to prevent unnecessary energy consumption by automatically controlling the amount of energy consumed by the consumer electronics.

SUMMARY

Additional aspects and/or advantages will be set forth in part in the description which follows and, in part, will be apparent from the description, or may be learned by practice.

The present inventive concept provides a method and an apparatus for efficiently and user-adaptively managing energy by analyzing an energy usage pattern of the user for using an electric device, instead of uniformly managing energy.

The present inventive concept also provides a method and an apparatus for providing analysis of deficient energy usage by analyzing a pattern of a user for using energy.

The present inventive concept also provides at least one non-transitory computer readable medium storing computer readable instructions to implement methods of one or more embodiments.

According to an aspect of the present inventive concept, there is provided a method of managing energy usage of an electric device, the method including detecting environment conditions including at least one of temperature, humidity, and luminance of an environment where the electric device is used; analyzing an energy usage pattern of a user for using the electric device; and generating energy management information for managing energy usage of the electric device based on the detected environment conditions and the analyzed energy usage pattern.

According to another aspect of the present inventive concept, there is provided an energy management device which manages energy usage of at least one electric device, the energy management device including a sensor unit for detecting environment conditions including at least one of temperature, humidity, and luminance of an environment where the electric device is used; a pattern analyzing unit for analyzing an energy usage pattern of a user for using the electric device; and an energy management unit for generating energy management information for managing energy usage of the electric device based on the detected environment conditions and the analyzed energy usage pattern.

According to another aspect of the present inventive concept, there is provided a computer readable recording medium having recorded thereon a computer program for executing the method of managing energy usage.

BRIEF DESCRIPTION OF THE DRAWINGS

The above and other features and advantages of the present inventive concept will become more apparent by describing in detail exemplary embodiments thereof with reference to the attached drawings in which:

FIG. 2 is a block diagram of an energy management device according to an embodiment of the present inventive concept;

FIG. 3 is a diagram showing an energy usage pattern that may be analyzed by a pattern analyzing unit, according to an embodiment of the present inventive concept;

FIG. 5 is a diagram showing an excessive usage reference pattern of an energy management unit according to an embodiment of the present inventive concept;

FIG. 6 is a diagram showing energy management history information generated by a history information generating unit according to an embodiment of the present inventive concept;

DETAILED DESCRIPTION

Figure 1:
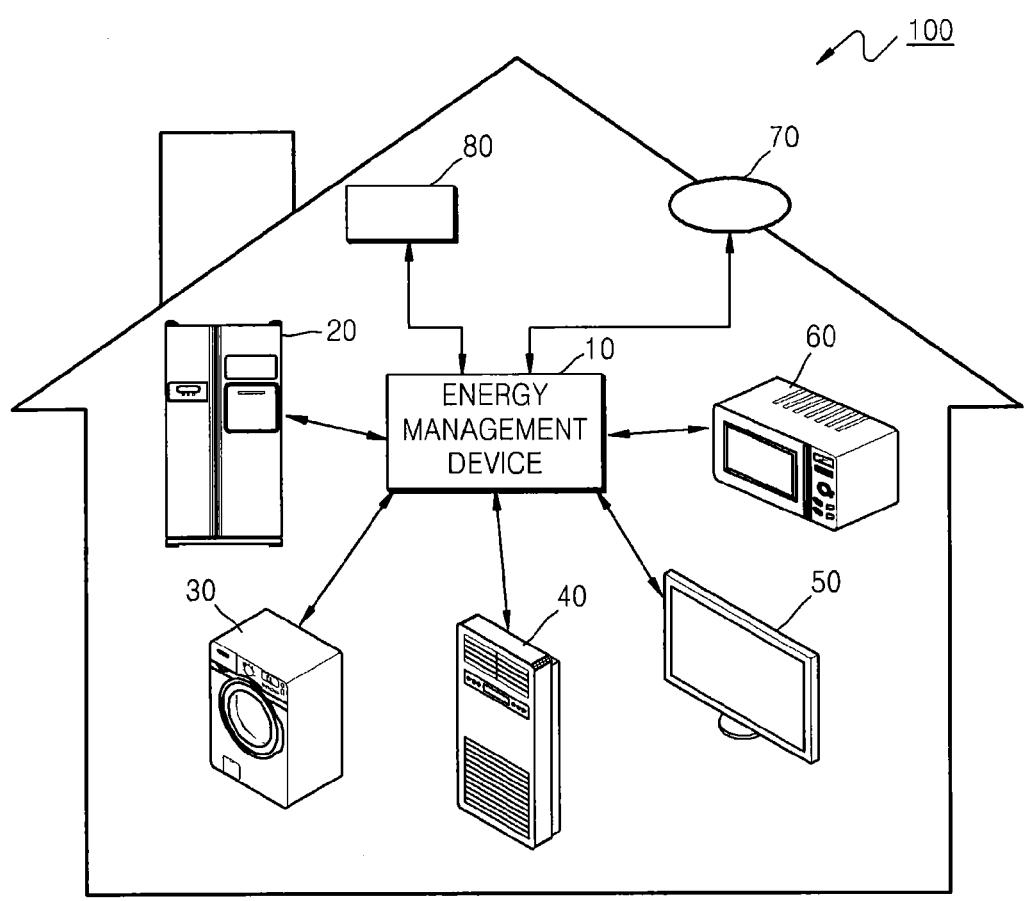
FIG. 1 is a diagram showing an energy management system (EMS) according to an embodiment of the present inventive concept.

Reference will now be made in detail to embodiments, examples of which are illustrated in the accompanying drawings, wherein like reference numerals refer to the like elements throughout. Embodiments are described below to explain the present inventive concept by referring to the figures.

Expressions such as "at least one of," when preceding a list of elements, modify the entire list of elements and do not modify the individual elements of the list.

FIG. 1 is a diagram showing an energy management system (EMS) 100 according to an embodiment of the present inventive concept. Referring to FIG. 1, the EMS 100 includes an energy management device 10, electric devices 20, 30, 40, 50, and 60, a sensor 70, and a smart meter 80.

When data regarding environment conditions are input by the sensor 70, the energy management device 10 according to the present embodiment controls the amount of energy consumed by the electric devices 20, 30, 40, 50, and 60 according to the environment conditions. The environment conditions refer to conditions to be considered by a user for using the electric devices 20, 30, 40, 50, and 60 and may include at least one of temperature, humidity, luminance, and movement of the user. However, the present inventive concept is not limited thereto.

According to another embodiment of the present inventive concept, when data regarding environment conditions are input by the sensor 70, the energy management device 10 may request a user to control the amount of energy consumed by the electric devices 20, 30, 40, 50, and 60 according to the environment conditions and provide suggestions for excessive energy usage.

For example, when an outside temperature is detected as an environment condition and the outside temperature is higher than usual, an appropriate room temperature may be maintained even if the energy consumption of a heating apparatus is lowered. The energy management device 10 may either maintain an appropriate room temperature by controlling usage of a heating apparatus or request a user to control usage of the heating apparatus. Furthermore, the energy management device 10 may inform the user about deficient energy usage and request the user to correct the energy usage.

The energy management device 10 according to another embodiment of the present inventive concept receives electricity price information from the smart meter 80 and requests a user to control the energy consumed the electric devices 20, 30, 40, 50, and 60 based on the electricity price information. The electricity price information may be any one of real time price (RTP), time of use (TOU), and progressive price, but the electricity price information is not limited thereto. The TOU refers to a plan wherein different electricity price rates are applied according to seasons or time slots.

For example, the energy management device 10 may detect TOU information as electricity price information, and if a laundry machine is operating in a time slot where a relatively expensive rate is applied, the energy management device 10 may either control usage of the laundry machine or request a user to control usage of the laundry machine. Generally, since usage of electricity is high during the daytime in summer and winter, relatively expensive electricity price rates are applied in corresponding time slots. If the energy management device 10 detects an operation of a laundry machine during the daytime in summer or winter, the energy management device 10 may control the laundry machine to stop the daytime operation and to start operating in the evening.

The sensor 70 detects environment conditions and provides the detected environment conditions to the energy management device 10. The environment conditions are the same as described above in relation to the energy management device 10.

As described above, the smart meter 80 provides the electricity price information to the energy management device 10.

FIG. 2 is a block diagram of the energy management device 10 according to an embodiment of the present inventive concept. Referring to FIG. 2, the energy management device 10 according to the embodiment shown in FIG. 2 includes a sensor unit 201, a pattern analyzing unit 202, and an energy management unit 203.

The sensor unit 201 detects environment conditions including at least one of temperature, humidity, and luminance. The sensor unit 201, may include an infrared sensor, a ultrasonic sensor, a microwave sensor, or a tomographic sensor. However, the present inventive concept is not limited thereto. For example, the sensor unit may include a dual-technology sensors or the combination of the sensors. The sensor unit 201 may further detect movement of a user. The sensor unit 201 transmits the detected environment conditions or the detected movement of the user to the energy management unit 203. The energy management device 10 detects environment conditions via the sensor unit 201 because it may be determined whether energy is excessively used based on the environment conditions or detected movement of a user. For example, even for the same usage of an air conditioner, energy may not be excessively used in the daytime, whereas energy may be excessively used during the night time. The reason is that greater usage of an air conditioner is demanded due to relatively high temperatures in the daytime, whereas less usage of an air conditioner is demanded due to relatively low temperatures during the night time. Therefore, the sensor unit 201 detects environment conditions and transmits the detected environment conditions to the energy management unit 203.

The pattern analyzing unit 202 analyzes an energy usage pattern, which is a consuming pattern of energy for using the electric devices. The pattern analyzing unit 202 receives energy usage patterns via a communication unit 409 from the electric devices 20, 30, 40, 50, and 60.

The energy usage pattern will be described below in closer detail. Manners and frequencies of using electric devices may vary from a user to a user. For example, a user may use a turbo function of an air conditioner or may open and close a door of a refrigerator more often than other individuals. The turbo function of an air conditioner is a function for increasing the amount of energy consumption for reducing the room temperature within a short period of time. The energy usage pattern includes all information for analyzing the habits of a user using electric devices, such as settings of the electric devices, frequencies of using the electric devices, and periods of time for using the electric devices. The pattern analyzing unit 202 analyzes the energy usage pattern in order to reduce the energy usage by inducing a user to correct the energy usage pattern if the energy usage pattern leads to excessive usage of electric devices.

FIG. 3 is a diagram showing an energy usage pattern that may be analyzed by the pattern analyzing unit 202, according to an embodiment of the present inventive concept. The pattern analyzing unit 202 according to the embodiment shown in FIG. 3 may analyze different types of energy usage patterns according to electric devices. For example, the pattern analyzing unit 202 may analyze operation modes, set temperatures, or operation times of an air conditioner. The operation modes refer to modes in which the air conditioner operates, e.g., a cooling mode, a turbo mode, an energy-saving mode, or a fan mode. The pattern analyzing unit 202 analyzes operation modes of an air conditioner because the amounts of energy consumed in an operation mode are different for each mode, the operation modes may be a factor for determining an energy usage pattern. Particularly, the turbo mode is a mode for cooling the air within a short period of time and more energy is consumed in this mode in order to maintain the same temperature as compared to other operation modes. If it is assumed that a user continuously uses the turbo mode, the energy management unit 203 may determine that the energy usage pattern of the user is the cause of the excessive energy usage.

For another example, the pattern analyzing unit 202 may analyze operation modes, set temperatures, door open durations, or door opening frequencies of a refrigerator. The operation modes refer to modes in which the refrigerator operates, e.g., a normal mode, a turbo mode, or an energy-saving mode. The turbo mode here is similar to that of an air conditioner and more energy is consumed in the turbo mode in order to significantly reduce the temperature within a short period of time. Therefore, the pattern analyzing unit 202 may provide operation modes of a refrigerator to the energy management unit 203, such that the energy management unit 203 may determine whether energy is excessively used.

The pattern analyzing unit 202 may analyze a set temperature of a refrigerator as an energy usage pattern of a user. The set temperature refers to a temperature to be maintained in a fridge or a freezer and is set by a user. If the set temperature is lower than that of a common usage of the refrigerator, more energy is consumed, and the energy management unit 203 may determine the situation as an excessive energy usage. Therefore, the pattern analyzing unit 202 may analyze set temperature of a refrigerator as an energy usage pattern of a user.

The pattern analyzing unit 202 may analyze door open durations or door opening frequencies of a refrigerator as an energy usage pattern of a user. The reason is that, if a door of a refrigerator is opened for a longer period of time, the temperature inside the refrigerator rapidly rises, and thus, more energy is consumed to lower the temperature inside the refrigerator again. Furthermore, more energy is consumed if a door of a refrigerator is frequently opened and closed, and thus, a user needs to avoid such actions to reduce energy consumption. Therefore, the pattern analyzing unit 202 may analyze door open durations or door opening frequencies of a refrigerator as an energy usage pattern of a user. The pattern analyzing unit 202 transmits the analyzed energy usage pattern to the energy management unit 203.

The energy management unit 203 generates energy management information, which is information for managing the amount of energy consumed by the electric devices based on the detected environment conditions and the analyzed energy usage pattern. The detected environment conditions are environment conditions detected by the sensor unit 201, whereas the analyzed energy usage pattern is an energy usage pattern analyzed by the pattern analyzing unit 202. The energy management information is information for managing usage of energy and is information for controlling an electric device by using detected environment conditions and an analyzed energy usage pattern if a user of the electric device uses excessive energy under the environment conditions.

An example thereof will be given below. A sensor unit 201 may detect that the outside temperature is 10 degrees Celsius by using the sensor 70. If it is assumed that the outside temperature detected by the sensor unit 201 is about 2 degrees lower than the usual temperature, the air conditioner may maintain a comfortable temperature with an amount of energy less than usual. Meanwhile, if the pattern analyzing unit 202 determines that a constant temperature set by a user is maintained regardless of the change of the detected outside temperature, the pattern analyzing unit 202 may analyze the set temperature as an energy usage pattern of the user. In other words, the user maintains a constant set temperature regardless of changes of outside temperature, and the maintenance of the constant set temperature may cause an excessive energy usage.

Therefore, it is necessary to consider both environment conditions and an energy usage pattern to determine whether energy is excessively used. To reduce the excessive energy usage, it is necessary to raise the set temperature, and thus, the energy management unit 203 generates energy management information which includes instruction information which instructs to the air conditioner to "raise the set temperature", thereby energy usage of the air conditioner may be reduced.

Figure 4:
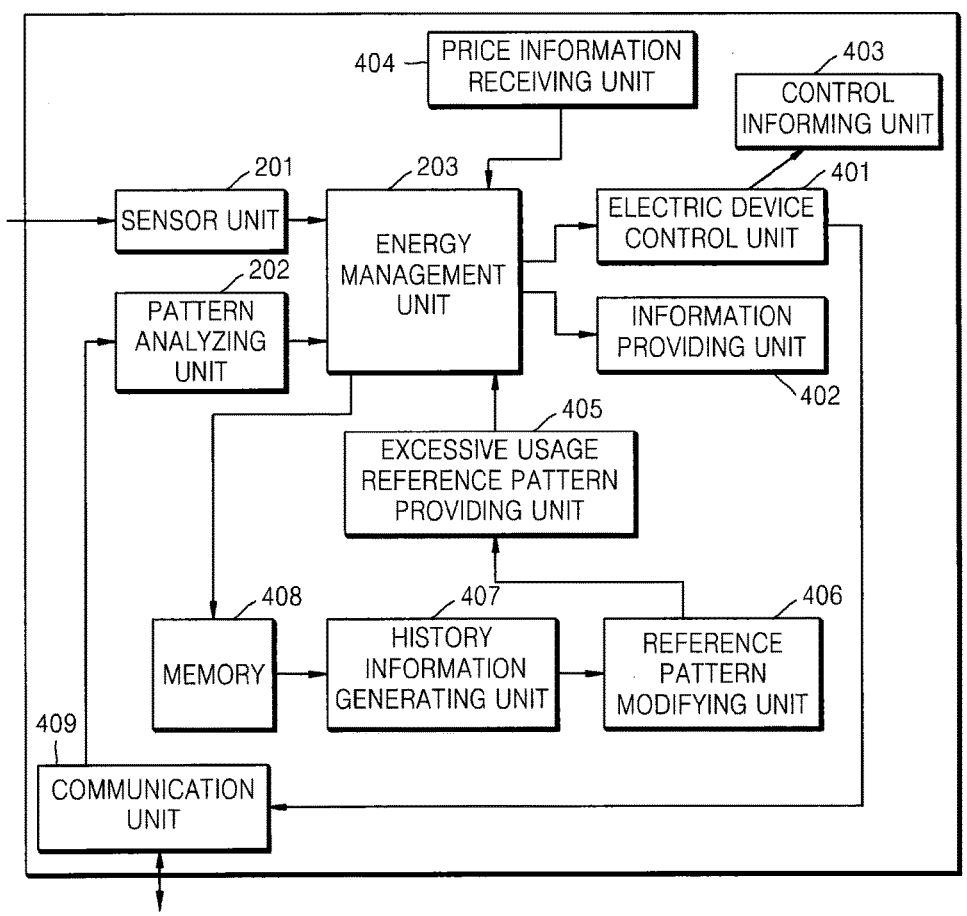
FIG. 4 is a block diagram of an energy management device according to another embodiment of the present inventive concept.

FIG. 4 is a block diagram of the energy management device 10 according to another embodiment of the present inventive concept. The energy management device 10 shown in FIG. 4 includes the sensor unit 201, the pattern analyzing unit 202, the energy management unit 203, an electric device control unit 401, an information providing unit 402, a control informing unit 403, a price information receiving unit 404, an excessive usage reference pattern providing unit 405, a history information generating unit 407, a memory 408, a reference pattern modifying unit 406, and the communication unit 409.

The sensor unit 201 and the pattern analyzing unit 202 are the same as those described above with reference to FIG. 2.

Referring to FIG. 4, the energy management unit 203 will be described in closer detail. The energy management unit 203 generates energy management information based on detected environment conditions and an analyzed energy usage pattern. The energy management information is the same as that described above with reference to FIG. 2.

The excessive usage reference pattern providing unit 405 provides an excessive usage reference pattern to the energy management unit 203. The excessive usage reference pattern is a reference for determining excessive energy usage in correspondence to predetermined environment conditions and energy usage patterns. If the energy usage pattern of the user exceeds the excessive usage reference pattern, it is determined that the energy usage pattern of the user is an excessive energy usage pattern. A plurality of excessive usage reference patterns may be stored in the excessive usage reference pattern providing unit 405 corresponding to a plurality of environment conditions.

The energy management unit 203 generates the energy management information by comparing the excessive usage reference pattern corresponding to the detected environment conditions to the analyzed energy usage pattern. If it is determined that the energy usage of the user is excessive, the energy management unit 203 generates the energy management information.

FIG. 5 is a diagram showing an excessive usage reference pattern of the energy management unit 203 according to an embodiment of the present inventive concept. References are respectively set for determining excessive energy usage of electric devices. For example, with respect to an air conditioner, the energy management unit 203 provides four excessive usage reference patterns. However, the present inventive concept is not limited thereto. For example, the energy management unit 203 sets the first excessive usage reference pattern in correspondence to a case where an air conditioner is operating in a cooling mode and a set temperature is 18 degrees Celsius. Therefore, if the air conditioner operates in the cooling mode with a set temperature of 18 degrees Celsius for 30 minutes, the energy management unit 203 determines that the air conditioner uses excessive energy and generates energy management information. By using the excessive usage reference pattern, the energy management unit 203 generates the energy management information which includes instruction information to instruct the air conditioner to change the set temperature up to 18 degrees Celsius in the cooling mode.

As other example of excessive usage reference patterns for an air conditioner, the energy management unit 203 sets a case in which a difference between the set temperature of the air conditioner and outside temperature is more than 5 degrees as an excessive usage reference pattern. Therefore, if the set temperature of the air conditioner is 5 degrees or more lower than the outside temperature detected by the sensor unit 201 and the air conditioner is operating for 30 minutes or longer under the condition, the energy management unit 203 determines that the air conditioner uses excessive energy and generates energy management information. The energy management information includes instruction information, for example, instruct the air conditioner to change the set temperature to be 5 degrees lower than the detected outside temperature. The energy management unit 203 determines excessive energy usages with respect to all other excessive usage reference patterns for an air conditioner in similar manners.

In the case of a TV, excessive usage reference patterns are based on duration of usage and electricity price information. In case of an excessive usage reference pattern according to an embodiment shown in FIG. 5, the energy management unit 203 sets a case in which no movement of a user is detected and duration of usage of a TV is four hours or longer as an excessive usage reference pattern. Therefore, if no movement of a user is detected and the duration of usage of a TV is four hours or longer, the energy management unit 203 determines that the TV uses excessive energy and generates energy management information. The energy management information includes instruction information which instructs the TV to turn off.

In the case of an excessive usage reference pattern according to an embodiment shown in FIG. 5, the energy management unit 203 sets a case in which no movement of a user is detected and duration of usage of a TV is one hour or longer in a time slot to which an expensive electricity price rate is applied as an excessive usage reference pattern. The energy management unit 203 receives electricity price information from the price information receiving unit 404. The electricity price information includes real time electricity price information. Here, the real time electricity price information is determined based on real time demands of electricity, and thus, the electricity price is generally more expensive in the daytime. When the electricity price received from the price information receiving unit 404 is equal to or above a predetermined value, if no movement of a user is detected and duration of usage of a TV is one hours or longer, the energy management unit 203 determines that the TV uses excessive energy and generates energy management information. The energy management information includes instruction information which instructs the TV to turn of.

In the case of an excessive usage reference pattern according to the embodiment shown in FIG. 5, the energy management unit 203 sets a case in which luminance is equal to a predetermined value and a LED lighting device is used for 30 minutes or longer as an excessive usage reference pattern. The reason of using the case where the luminance is equal to a predetermined value is that it is necessary to use a lighting device even in the daytime according to weather conditions. Therefore, if the luminance is equal to or higher than a predetermined value and the LED lighting device is used for 30 minutes or longer, the energy management unit 203 determines that the LED lighting device uses excessive energy and generates energy management information. The energy management information includes instruction information which instructs the LED lighting device to turn off.

The electric device control unit 401 generates control signals to control the electric devices 20, 30, 40, 50, and 60 by using the energy management information generated by the energy management unit 203 and outputs the control signals to the communication unit 409. As described above, the energy management information is information for managing energy usage. The electric device control unit 401 controls the electric devices 20, 30, 40, 50, and 60 via the communication unit 409.

The control signals generated by the electric device control unit 401 may not only control turning on/off of the electric devices 20, 30, 40, 50, and 60, but also control operation modes of the electric devices 20, 30, 40, 50, and 60. For example, in the case of an air conditioner, if energy management information generated by the energy management unit 203 includes instruction information which instructs the air conditioner to change operation mode of air conditioner from turbo mode to cooling mode, the electric device control unit 401 may generate a control signal for changing operation mode of the air conditioner from turbo mode to cooling mode. Furthermore, if energy management information generated by the energy management unit 203 includes instruction information which instructs the air conditioner to turn off air conditioner, the electric device control unit 401 may generate a control signal to turn off the air conditioner.

The information providing unit 402 provides energy management information to a user. The energy management information is the same information generated by the energy management unit 203 as described above. The energy management device 10 according to an embodiment of the present inventive concept provides energy management information to correct a user's excessive energy usage. For example, if the energy management information includes instruction information which instructs the air conditioner to "change operation mode of air conditioner from turbo mode to cooling mode," the information providing unit 402 may inform the user that energy usage in the turbo mode is excessive energy usage by displaying the energy management information. The control informing unit 403 informs a user that electric devices are being controlled by the electric device control unit 401. Since the electric device control unit 401 changes settings of the electric devices 20, 30, 40, 50, and 60 set by a user, information regarding whether the electric devices 20, 30, 40, 50, and 60 are being controlled and details of controls are transmitted to the user. The details of controls may refer to operation modes of the electric devices 20, 30, 40, 50, and 60 that are changed by control signals or turning on/off of the electric devices 20, 30, 40, 50, and 60 by the control signals. Therefore, if an operation mode of an air conditioner is changed from a turbo mode to a cooling mode by the electric device control unit 401, the control informing unit 403 displays that the air conditioner is currently being controlled and an operation mode thereof is changed from the turbo mode to the cooling mode.

The price information receiving unit 404 receives electricity price information from the smart meter 80. The reason that price information receiving unit 404 receives electricity price information is to induce usage of the electric devices 20, 30, 40, 50, and 60 in time slots where relatively low electricity price rates are applied, since different electricity price rates are applied according to time slots. The electricity price information is the same as that described above in relation to the smart meter 80.

The excessive usage reference pattern providing unit 405 provides excessive usage reference patterns to the energy management unit 203. The excessive usage reference patterns are the same as those described above with reference to FIG. 3. The excessive usage reference pattern providing unit 405 stores the excessive usage reference patterns therein and provides the stored excessive usage reference patterns to the energy management unit 203.

The history information generating unit 407 provides energy management history information to the reference pattern modifying unit 406. The history information generating unit 407 generates the energy management history information by using usage history information and weather history information that constitute a user's pattern of using a corresponding electric device in the past. The weather history information is history information regarding environment conditions at time points corresponding to the usage history information.

The energy management device 10 may further comprise a price predicting unit (which is not illustrated in FIG. 4) for predicting future electricity price of a case where an electric device is continuously used according to the analyzed energy usage pattern, based on the electricity price information and the analyzed energy usage pattern.

FIG. 6 is a diagram showing energy management history information generated by the history information generating unit 407 according to an embodiment of the present inventive concept. The energy management history information shown in FIG. 6 is energy management history information regarding an air conditioner. If an energy usage pattern is a cooling mode and a set temperature is 5 degrees Celsius or more lower than an outside temperature, the energy management unit 203 generates energy management information including instruction information which instructs the air conditioner to change set temperature to be 5 degrees lower than the outside temperature.

The history information generating unit 407 generates energy management history information by matching energy management information, environment conditions, and energy usage patterns that are previously generated. The history information generating unit 407 browses energy management information, environment conditions, and the energy usage pattern that were previously generated in the memory 408. The history information generating unit 407 provides the generated energy management history information to the reference pattern modifying unit 406 according to an embodiment of the present inventive concept.

The reference pattern modifying unit 406 modifies the excessive usage reference pattern based on a user input. Since the excessive usage reference pattern is affected by characteristics of a user of a corresponding electric device or surrounding environment, it is necessary to modify the excessive usage reference pattern based on the same characteristics. For example, in the case of an air conditioner, preferred room temperatures may vary according to users. If excessive energy usage is continuously informed to a user or a set temperature is raised by controlling an air conditioner in the case of the user who prefers a relatively low temperature, the user may feel uncomfortable. The reference pattern modifying unit 406 receives a user input and modify an excessive usage reference pattern corresponding to a set temperature of an air conditioner, so that the user may set a desired temperature as a reference temperature for determining excessive energy usage. Furthermore, the reference pattern modifying unit 406 may receive a user input and delete an excessive usage reference pattern corresponding to a set temperature of an air conditioner.

The reference pattern modifying unit 406 according to another embodiment of the present inventive concept modifies the excessive usage reference pattern based on energy management history information. The energy management history information is information generated by the history information generating unit 407 described above and indicating a history of energy management information. The reference pattern modifying unit 406 receives the energy management history information from the history information generating unit 407.

If a user continuously uses energy exceeding the excessive usage reference pattern, the energy management device 10 may continuously controls and limits an amount of energy consumed by a corresponding electric device. However, if the user still continues to use energy exceeding the excessive usage reference pattern, it is necessary to modify the excessive usage reference pattern. The reason is that demands of the user using the electric device may take precedence over efficient energy usage. In other words, the energy management device 10 may use a reference of excessive energy usage customized for a specific user.

Referring to energy management history information shown in FIG. 6, a set temperature of an air conditioner is continuously set to be lower than the excessive usage reference pattern. In this case, the energy management unit 203 generates energy management information including instruction information, for example, to instruct the air conditioner to change set temperature of air conditioner to be 5 degrees lower than outside temperature.

As shown in FIG. 6, if the energy management history information shows that the energy management information has been continuously instructing the air conditioner to "reduce set temperature of air conditioner," the reference pattern modifying unit 406 may modify set temperature corresponding to the excessive usage reference pattern. In this case, if the energy management information has been instructing the air conditioner to "reduce set temperature of air conditioner" for a predetermined number of times (e.g., 10 times), set temperature corresponding to the excessive usage reference pattern may be modified. The reason that the reference pattern modifying unit 406 modifies the excessive usage reference pattern is to provide an excessive usage reference pattern customized for a user of a corresponding electric device. If it is necessary to allow the excessive usage for a user, the excessive usage reference pattern is modified to meet the demand of the user. Referring to FIG. 6, since the user has been continuously set a set temperature of an air conditioner to be from 6 degrees to 9 degrees lower than outside temperatures from Jul. 1, 2010 to Aug. 30, 2010, the excessive usage reference pattern may be modified to change a set temperature of the air conditioner to be 5 degrees lower than an outside temperature.

The memory 408 matches the energy usage patterns, the environment conditions, and the energy management information to each others and stores the same. The memory 408 provides the energy usage patterns, the environment conditions, and the energy management information to the history information generating unit 407.

The communication unit 409 delivers control signals generated by the electric device control unit 401 to respective electric devices. Furthermore, the communication unit 409 exchanges data with the electric devices to deliver energy usage patterns to the pattern analyzing unit 202.

The communication unit 409 may exchange data with electric devices via a wired or wireless network or wired serial communication. Here, the network may be the Internet, a local area network (LAN), a wireless LAN, a wide area network (WAN), or a personal area network (PAN). However, the present inventive concept is not limited thereto, and the network may be any of various other types of networks for exchanging data.

Figure 7:
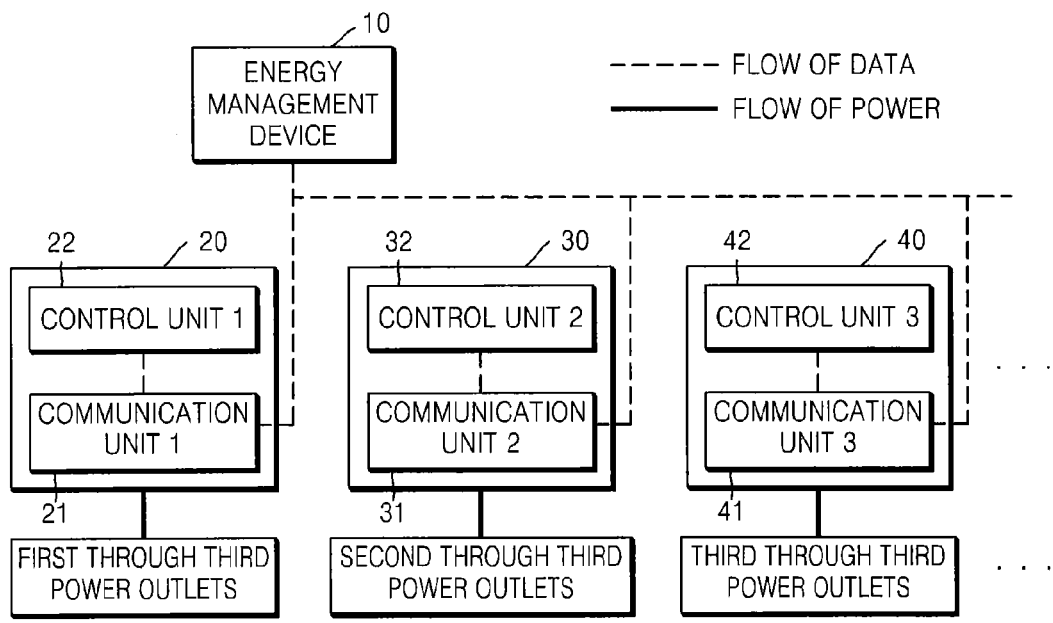
FIG. 7 shows communication paths between an energy management device and electric devices according to an embodiment of the present inventive concept.

FIG. 7 shows communication paths between the energy management device 10 and the electric devices 20, 30, and 40 according to an embodiment of the present inventive concept. Referring to FIG. 7, the communication unit 409 of the energy management device 10 communicates with each of the electric devices 20, 30, and 40. The electric devices 20, 30, and 40 are respectively connected to first through third power outlets for receiving power supply. The broken lines indicate flow of data, whereas the solid lines indicate flow of power. In each of the electric devices 20, 30, and 40, a communication unit is connected to a control unit, where control signals generated by the electric device control unit 401 of the energy management device 10 are input to respective communication units 21, 31, and 41 and are delivered to respective control units 22, 32, and 42. When the control units 22, 32, and 42 receive the control signals, the control units 22, 32, and 42 control the electric devices 20, 30, and 40 according to the control signals, respectively. For example, in the case of the air conditioner 20, the control unit 22 may control change of an operation mode, change a set temperature, or turning on/off of the air conditioner 20.

Figure 8:
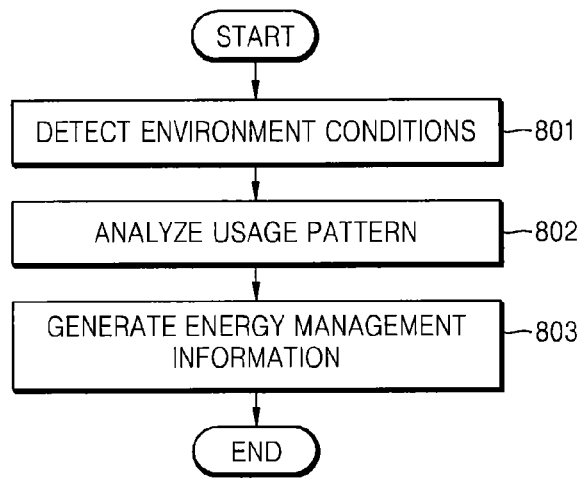
FIG. 8 is a flowchart showing a method of managing energy according to an embodiment of the present inventive concept.

FIG. 8 is a flowchart showing a method of managing energy according to an embodiment of the present inventive concept. In an operation 801, the sensor unit 201 detects environment conditions. The environment conditions indicate at least one of temperature, humidity, luminance, and movement of a user around electric devices. In an operation 802, the pattern analyzing unit 202 analyzes energy usage patterns of a user for using the electric devices. The energy usage pattern is the same as that described above in relation to the pattern analyzing unit 202. In an operation 803, the energy management unit 203 generates energy management information based on the environment conditions detected in the operation 801 and the energy usage patterns analyzed in the operation 802.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD-ROM disks, DVDs and Blu-rays; magneto-optical media such as optical disks; and hardware devices that are specially configured to store and perform program instructions, such are read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method comprising:
storing, in an energy management apparatus, a plurality of excessive usage reference patterns, each excessive usage reference pattern including an operation of at least one electric device performed over a predetermined period of time;
detecting, using a sensor of the energy management apparatus, environment conditions of the at least one electric device, the environment conditions including at least one of temperature, humidity, luminance of an environment of the at least one electric device, and a movement of a user of the at least one electric device;
obtaining, using an interface of the energy management apparatus, electricity price information;
selecting, using a processor of the energy management apparatus, an excessive usage reference pattern, from the stored plurality of excessive usage reference patterns, based on the obtained electricity price information and the detected environment conditions;
receiving, from the at least one electric device and using the interface of the energy management apparatus, an energy usage of the at least one electric device;
analyzing, using the processor of the energy management apparatus, the received energy usage to generate an energy usage pattern;
comparing, using the processor of the energy management apparatus, the generated energy usage pattern to the selected excessive usage reference pattern;
determining, using the processor of the energy management apparatus, whether the generated energy usage pattern is excessive based on the comparing; and
in response to the determining that the generated energy usage pattern is excessive:
generating energy management information, based on the generated energy usage pattern and the excessive usage reference pattern; and
controlling an operation of the at least one electric device according to the generated energy management information.

2. The method of claim 1, further comprising providing the generated energy management information to the user.

3. The method of claim 1, further comprising transmitting, to the at least one electric device, a control signal in response to the determining that the generated energy usage pattern of the user is other than excessive.

4. The method of claim 1, further comprising informing the user about the changed operation of the at least one electric device.

5. The method of claim 1, further comprising predicting an electricity cost based on whether the at least one electric device is used according to the generated energy management information.

6. The method of claim 1, further comprising modifying the selected excessive usage reference pattern in response to a user input.

7. The method of claim 1, further comprising storing the generated energy usage pattern as historical information, and modifying the stored plurality of excessive usage reference patterns based on the stored historical information.

8. At least one non-transitory computer readable recording medium comprising computer readable instructions that control at least one processor to implement the method of claim 1.

9. An energy management apparatus comprising:
at least one sensor configured to detect environment conditions of at least one electric device, the environment conditions including at least one of temperature, humidity, luminance of an environment of the at least one electric device, and a movement of a user of the at least one electric device; and
at least one processor configured to:
store a plurality of excessive usage reference patterns, each excessive usage reference pattern including an operation of the at least one electric device performed over a predetermined period of time;
obtain electricity price information;
select an excessive usage reference pattern, from the stored plurality of excessive usage reference patterns, based on the obtained electricity price information and the detected environment conditions;
receive, from the at least one electric device, an energy usage of the at least one electric device;
analyze the received energy usage to generate an energy usage pattern;
compare the generated energy usage pattern to the selected excessive usage reference pattern;
determine whether the generated energy usage pattern is excessive based on the comparing; and
in response to the determining that the generated energy usage pattern is excessive:
generate energy management information, based on the generated energy usage pattern and the excessive usage reference pattern; and
control an operation of the at least one electric device according to the generated energy management information.

10. The energy management device of claim 9, wherein the at least one processor is further configured to provide the generated energy management information to the user.

11. The energy management device of claim 9, wherein the at least one processor is further configured to transmit, to the at least one electric device, a control signal in response to the determining that the generated energy usage pattern of the user is other than excessive.

12. The energy management device of claim 9, wherein the at least one processor is further configured to inform the user about the changed operation of the at least one electric device.

13. The energy management device of claim 9, wherein the at least one processor is further configured to predict an electricity cost based on whether the at least one electric device is used according to the generated energy management information.

14. The energy management device of claim 9, wherein the at least one processor is further configured to modify the selected excessive usage reference pattern in response to a user input.

15. The energy management device of claim 9, wherein the at least one processor is further configured to:
store the generated energy usage pattern as historical information, and
modify the stored plurality of excessive usage reference patterns based on the stored historical information.

* * * * *